United States Patent [19]

Engel et al.

[11] Patent Number: 4,615,852
[45] Date of Patent: Oct. 7, 1986

[54] METHOD FOR PRODUCING NITROCELLULOSE-BASED CARBON BLACK CONCENTRATES IN THE FORM OF CHIPS

[75] Inventors: Claus R. Engel, Waldorf; Lutz Dworowy, Bruehl, both of Fed. Rep. of Germany

[73] Assignee: Degussa Aktiengesellschaft, Frankfurt, Fed. Rep. of Germany

[21] Appl. No.: 577,427

[22] Filed: Feb. 6, 1984

[30] Foreign Application Priority Data

Feb. 11, 1983 [DE] Fed. Rep. of Germany ....... 3304688

[51] Int. Cl.[4] ................................................. B29B 9/02
[52] U.S. Cl. .................................... 264/118; 106/172; 106/195; 106/307; 264/349
[58] Field of Search ................... 106/172, 195, 308 F, 106/307; 264/118, 348, 349

[56] References Cited

U.S. PATENT DOCUMENTS

| | | | |
|---|---|---|---|
| 2,544,363 | 3/1951 | Siemons | 106/195 |
| 3,275,250 | 9/1966 | Plunguian | 106/195 |
| 3,617,323 | 11/1971 | Riegler | 106/308 F |
| 3,948,672 | 4/1976 | Rat et al. | 106/195 |
| 4,197,221 | 4/1980 | Eisenmenger et al. | 106/26 |
| 4,460,411 | 7/1984 | Ohtake et al. | 106/195 |

FOREIGN PATENT DOCUMENTS 1245268 9/1971 United Kingdom .

*Primary Examiner*—James Lowe
*Attorney, Agent, or Firm*—Beveridge, DeGrandi & Weilacher

[57] ABSTRACT

The invention relates to a method for producing nitrocellulose-based carbon black in the form of chips. The recipe constituents are blended into a mixture and converted at an elevated temperature into a dispersion in a suitable device which achieves the desired degree of kneading such as a kneading machine or roller die extruder. The dispersion is then calendered into a film, the film is cooled and crushed into chips. The carbon black concentrates can be used as pigmentation agents for lacquers, paints and printing inks.

14 Claims, No Drawings

METHOD FOR PRODUCING NITROCELLULOSE-BASED CARBON BLACK CONCENTRATES IN THE FORM OF CHIPS

The invention relates to the production of carbon black concentrates in the form of chips and based on nitrocellulose-containing bonding agents that enable manufacturers of, for example, lacquers, paints and printing inks to produce these types of black products in a variety of ways and to overcome the problems that would otherwise arise when dispersing carbon black, particularly powdery carbon black.

A method for the production of carbon black concentrates is known and described in West German Pat. No. 26 48 639. According to this method, a mixture consisting of alcohol moistened nitrocellulose, plasticizing agent, dispersing or wetting agent, and possibly alkyd resin, is blended in a kneading machine accompanied by the addition of a solvent; carbon black is kneaded into this premixed mass; the resulting product is calendered into sheets by means of a mixing roll in order to further disperse the carbon black with coincident evaporation of the solvent; and is then crushed into chips.

A disadvantage with this process is that the solvent employed must be evaporated, which requires an expenditure of energy and could lead to a critical impact on the workplace and the environment. In addition, this method requires a considerable number of personnel and may involve safety risks.

It is the primary object of the invention to provide a manufacturing technique which yields products with the well-known quality but which require no solvents and can be produced more economically and with significantly less risk to one's safety.

This object is achieved by the use of a process for the production of nitrocellulose-based carbon black concentrates in the form of chips and which comprises:
 (a) nitrocellulose
 (b) optionally a nitrocellulose-compatible resin
 (c) carbon black
 (d) plasticizer, and
 (e) wetting agent
and which method comprises thoroughly mixing the nitrocellulose, and optionally the resin, with the other recipe constituents to form a free-flowing mixture, converting the mixture into a dispersion at an elevated temperature by means of a kneading machine or a roller die extruder, calendering the dispersion into a film, cooling the film down to a temperature that allows it to be crushed, then crushing it into chips.

The nitrocellulose can be provided in the form of commercially available chips which, in the planetary mixer preferably used to produce the free-flowing mixture, are reduced in size, e.g. from 6 $cm^2 \times 1$ mm to 0.5 $cm^2 \times 1$ mm, then mixing them with the other recipe constituents. Nitrocellulose wool can also be used. The starting materials of the invention are free of volatile solvents such as low molecular weight alcohols; e.g. ethanol.

Advantageously, this discontinuously prepared free-flowing mixture composed of the initial substances (a) to (c) is fed by means of a dosing apparatus into a preferably continuously working kneader in which the carbon black is dispersed and where the temperature of the kneaded material does not exceed say, 110° C., preferably between 50° and 110° C. A so-called Co-kneader (e.g. manufactured by Buss, Pratteln) is preferred: a single-shaft screw machine whose screws are interrupted three times per circumference and which, besides rotating, also executes strokes along the worm axis. The helical blades serve as kneading tools whose action is reinforced by the axial strokes. The motion in two planes is produced by means of a special gearing.

Special safety precautions must be taken because of the tendency of self-ignition of the nitrocellulose. It is very important that the kneader trough be equipped with a plurality of stations to measure temperatures and pressures, as well as with pressure-retaining members.

Instead of the continuously working Co-kneader, a roller die extruder (e.g., manufactured by Berstorff, Hannover) with similar action may be used consisting of a single-shaft worm, which changes into a planetary gearing at the discharge. Very thorough kneading is accomplished by this likewise continuously working machine, but the temperature development must be monitored very carefully. Any other suitable apparatus which accomplishes the desired degree of kneading to form the dispersion may be used.

The kneadable dispersion discharged by the kneader of the extruder then passes without intermediate cooling through a film roller mill, which enables a film to be stripped to a desired thickness. By means of a film roller mill, whose pair of rollers works with 1:1.2 friction, the carbon black is finely dispersed under optimal conditions. For this process, the material to be treated is exposed to temperatures not exceeding 110° C., preferably between 50° to 110° C. Preferably, the film is calendered so as to have a thickness under 1 mm and is then subjected to cooling. This cooling results in a certain embrittlement, which facilitates the subsequent crushing operation. Advantageously, cooling occurs below 30° C., preferably between 10° and 20° C. At these temperatures, the film is brittle enough to be masticated in a crusher, e.g., a chopping machine.

By means of a belt-type cooler, i.e., a water-cooled conveyor belt made of steel plate, the dispersion steps, the film production, the cooling and the crushing into chips can be effected continuously. The crushing of the cooled film is best carried out in a chopping machine, and one strives at obtaining dimensions of 0.5 $cm^2 \times 0.5$ mm.

Surface and layer thickness of the chips determine their solubility, so that these two quantities can be varied depending upon the subsequent application by appropriately adjusting the film roll and the chopper within specific limits.

The new process permits the production of nitrocellulose-based carbon black concentrates with the conventional compositions.

Most effective are compositions with the following quantities of feed stock:
 (a) nitrocellulose: 30–80% by weight
 (b) nitrocellulose-compatible resin: 0–30% by weight
 (c) carbon black: 10–50% by weight
 (d) plasticizer: 5–30% by weight
 (e) wetting agent: 0.5–2.5% by weight Both furnace and gas blacks as well as flame blacks can be used as black. Furnace or gas blacks that have undergone an oxidative aftertreatment are well suited. Such blacks are distinguished by their content of volatile constituents of over 0.5% by weight.

If the nitrocellulose is to be combined with resins with other compositions, these resins must be compatible with the main bonding agent. Alkyd resins, polyamide resins, maleinate resins, ketone resins or shellac have proved to be useful. Mixtures of these resins with the main bonding agent nitrocellulose can also be employed.

Suitable plasticizers are:

phthalates (phthalic acid esters), e.g., dioctylphthalate (DOP), dimethylphthalate, diethylphthalate, dibutylphthalate, optionally combined with diethylphthalate, dicyclohexylphthalate; higher-molecular esters of decyl and tridecyl alcohol; mixed-ester plasticizer, e.g. butyloctyl-, butyldecyl-, butyl-genzyl phthalate, diamylphthalate, diethylhexylphthalate, dimethylglycolphthalate, dicaprylphthalate and the like;

phosphates, e.g. tricresylphosphate, triphenylphosphate combined with tricresylphosphate and phthalates, diphenylcresylphosphate, triphenylphosphate, diphenyl-2-ethylhexylphosphate, tri(2-ethylhexyl)-phosphate, tris(butoxyethyl)-phosphate; acyclic (aliphatic)-di-carbonic acid esters, e.g., esters of the adipic acid and sebacic acid (dioctyladipate), diacyladipate, dicapryladipate, dibutylsebacate, 2-ethylhexylsebacate, di-octylsebacate, dihexylsebacate, butylbenzylsebacate, etc.;

fatty acids, e.g., butyloleate or butylstearate, methyl- and butylesters of the acetylized ricinol fatty acids, fatty acid glycol esters, triethylene-glycol-di-(2-ethylbutyrate), esters of the epoxystearic acid, citric acid esters, e.g., acetyltributylcitrate, acetyltriethylcitrate; and polymer plasticizers, e.g., polyesters of dicarbonic acids (adipic-, sebacic-, phthalic acid) and glycols (propyleneglycol, 2-ethyl-1,3-hexandiol and the like) partially modified with monofunctional acids or alcohols; MW about 850–8000. Epoxidized oils, butadiene acrylonitrile copolymers may likewise be considered as plasticizers.

Metal oleates, metal octoates and phenylenediamine are particularly well suited as wetting agents. Any suitable wetting agent may be used.

The carbon black concentrates that are obtainable in accordance with the process of the invention can be used as pigmentation agents for lacquers, paints and printing inks, whereby 0.01–20% by weight black concentrate can be added to the particular system of application concerned.

Lacquers and paints are liquid to paste-like substances or mixtures of substances that can be applied to the surfaces to be coated by various procedures such as painting or spraying, resulting in a coating that adheres to the priming coat by physical or chemical drying.

Carbon black concentrates can also be used as pigmentation agent for printing inks such as newspaper printing ink, book and job inks, halftone inks, dyed printing inks, heat-set inks or moisture and steam-set inks which are used for the different printing methods, such as letterpress printing, flexographic printing, planographic printing, gravure printing, etc.

The invention will now be illustrated by reference to comparative examples with the most nearly connected prior art and of the subject of the invention. First, the test methods used for comparison purposes will be discussed.

TEST METHODS FOR EVALUATING THE CARBON BLACK CONCENTRATES

The Hegman gauge value is determined in compliance with DIN 53203. The Hegman gauge value reflecting the carbon black distribution is established in butylacetate on the so-called Hegman block on a dispersion of the chips produced.

The depth of color is determined as follows:

In a PE cup, 96 g NC thinner (38.9 parts by weight methylethylketone + 27.8 parts by weight butylacetate + 33.3 parts by weight toluene) and 24 g chips of nitrocellulose carbon black is weighed in. The chips are dissolved at 4000 rpm (peripheral velocity = 10.472 m/min) for 15 minutes. A portion of the chip solution is absorbed by means of a spiral film absorbing apparatus as film with a wet-film thickness of 200 $\mu$m onto a white glazed cardboard. The depth of color is measured on the dry film with the densitometer at 5 different points, in each case as a so-called densitometer index, or with the RFC3 at two different points. The mean value is obtained from the number of the measured depth of color values.

The gloss is determined at a 20° angle with the Gardner glossmeter. The measured result represents the so-called reflectiometer values.

The viscosity is determined in accordance with DIN 53211.

The superiority of the process of the invention over the prior art is documented experimentally in the following section.

COMPARISON OF PROCESS AND PROPERTIES OF A CARBON BLACK CONCENTRATE OBTAINABLE IN ACCORDANCE WITH WEST GERMAN PAT. NO. 26 48 639 WITH A CARBON BLACK CONCENTRATE OF THE INVENTION WITH THE SAME INITIAL COMPOSITION

In each case, a standard product is prepared in the manner taught by West German Pat. No. 26 48 639 and by the invention and the energy expenditure required therefor as well as the quality of the product are evaluated.

EXAMPLE 1

(Prior Art Process)

| Recipe | |
|---|---|
| Nitrocellulose wool (with 35% by weight ethanol, viscosity 24") | 22.7% by weight S* |
| Nitrocellulose chips, approximately 6 cm² × 1 mm (with 18% by weight dioctylphthalate, viscosity 24") | 29.7% by weight S* |
| Dioctylphthalate plasticizer | 27.2% by weight S* |
| Wetting agent barium octoate (in 50% xylene) | 2.4% by weight S* |
| Carbon black FW2 | 18.0% by weight S* |

S* = calculated as solid matter

The batch is reacted with 5.3% parts by weight ethyl acetate.

Implementation

For the premixture, nitrocellulose wool, nitrocellulose chips, plasticizer, wetting agent and solvent are caused to gel in a 400-liter kneader equipped with Z blades for about 1.5 hours. The carbon black is then added in portions and kneaded for another 1.5 hours. The kneaded mass weighs about 250 kg.

For the fine dispersion, the kneaded mass is subjected to 6–8 roll passages on a mixing roll (two-roll mill with 1:1.2 friction) and freed from the solvent to about 10% by weight. The throughput rate is approximately 17.5 kg/hour.

For the drying, the finely dispersed material which is stripped off as a thin film during the passage through the last roller is freed from solvent residues in a drying room by means of a hot air current of 40° C. This causes the film to become brittle. The residence time of the batch in this step is about 14 hours.

The embrittled material is then masticated in a chopper with a cutter rotor and a revolving screen into granules measuring 1 cm$^2$×0.5 mm (screen aperture approximately 1 cm$^2$), for which 1 hour is needed.

| Results | |
|---|---|
| Hegman gauge value: | 13 μm |
| Depth of color (densitometer index) | 3.1 |
| Gloss | 92% |
| Viscosity (DIN cup 4-mm nozzle) | 90 sec |

EXAMPLE 2

(Prior Art Method)

| Recipe | |
|---|---|
| Nitrocellulose wool (with 35% by weight ethanol, viscosity 21″) | 23.0% by weight S* |
| Nitrocellulose chips, about 6 cm$^2$ × 1 mm (with 18% dioctylphthalate, viscosity 21″) | 30.0% by weight S* |
| Dioctylphthalate plasticizer | 27.0% by weight S* |
| Wetting agent p-phenylenediamine | 2.0% by weight S* |
| Carbon black FW2 | 18.0% by weight S* |

S* = calculated as solid matter

The batch is reacted with 3.5% by weight ethylacetate.

Implementation (As in Example 1)

| Results | |
|---|---|
| Hegman gauge value | 20 μm |
| Depth of color (densitometer index) | 3.0 |
| Gloss | 89% |
| Viscosity (DIN cup, 4 mm nozzle) | 150 sec |

EXAMPLE 3

(Prior Art Method)

| Recipe | |
|---|---|
| Nitrocellulose wool (with 35% butanol, viscosity 30″) | 50.0% by weight S* |
| Carbamic acid ester plasticizer | 18.5% by weight S* |
| Wetting agent p-phenylenediamine | 1.5% by weight S* |
| Carbon black Printex V | 30.0% by weight S* |

S* = calculated as solid matter

Implementation (As in Example 1)

| Results | |
|---|---|
| Hegman gauge value | >20 μm |
| Depth of color (densitometer index) | 2.5 |
| Gloss | 65% |
| Viscosity (DIN cup, 4 mm nozzle) | 25 sec |

EXAMPLE 4

(Prior Art Method)

| Recipe | |
|---|---|
| Nitrocellulose wool (with 35% by weight butanol, viscosity 30″) | 44.0% by weight S* |
| Carbamic acid ester plasticizer | 14.5% by weight S* |
| p-phenylenediamine | 1.5% by weight S* |
| Carbon black "Spezialschwarz" 15 | 40.0% by weight S* |

S* = calculated as solid matter

Implementation (As in Example 1)

| Results | |
|---|---|
| Hegman gauge value | >20 μm |
| Depth of color (densitometer index) | 2.5 |
| Gloss | 65% |
| Viscosity (DIN cup, 4 mm nozzle) | 20 sec |

EXAMPLE 5

(Method of the Invention)

| Recipe | |
|---|---|
| Nitrocellulose chips, up to about 6 cm$^2$ × 1 mm (with 18% by weight dioctylphthalate or dibutylphthalate, viscosity 24″) | 52.4% by weight S* |
| Dioctylphthalate plasticizer | 27.2% by weight S* |
| Wetting agent barium octoate in 50% by weight dioctylphthalate | 2.4% by weight S* |
| Carbon black FW2 | 18.0% by weight S* |

S* = calculated as solid matter

Implementation

The premixing occurs in a planetary mixer with 2 rotors which rotate about a common axis as well as about their own axis. In the planetary mixer (300-liter content), the nitrocellulose chips are crushed into free-flowing granules measuring about 0.5 cm$^2$; the carbon black is then intermixed slowly and the plasticizer is added with the wetting agent. Adherence to the indicated sequence is advisable. Mixing time for a feed with 170 kg starting material is about 0.75 hour. It will be noted that operation in accordance with the invention means that no solvent for the nitrocellulose is present in the system.

The dispersion occurs in a continuously working single-shaft worm kneader with variable speed. The free-flowing premixture is fed to the kneader by means of a dosing apparatus. The carbon black is finely distributed in the batch with a temperature of the kneaded mass not exceeding 110° C. The throughput rate is about 100 kg per hour.

The calendering into a film occurs in a twin-roll mill whose rolls operate with 1:1.2 friction. This results in additional shear forces which further increase the degree of carbon black distribution. A film of about 0.5 mm is stripped off.

The resulting film is cooled down from 80° C. to 15° to 20° C. on a water-cooled conveyor belt made of steel plate. Pelletizing is possible without the chips collecting into clumps.

The film coming from the cooling belt, still kneadable but already crushable, runs into a chopper and is reduced into chips measuring 0.5 cm² × 0.5 mm.

| Results | |
|---|---|
| Hegman gauge value | 10 μm |
| Depth of color (densitometer index) | 3.2 |
| Gloss | 94% |
| Viscosity (DIN cup, 4 mm nozzle) | 138 sec |

EXAMPLE 6
(Method of the Invention)

| Recipe | |
|---|---|
| Nitrocellulose chips, about 6 cm² × 1 mm (with 18% by weight dioctylphthalate or dibutylphthalate, viscosity 21″) | 53.0% by weight S* |
| Dioctylphthalate plasticizer | 27.0% by weight S* |
| Wetting agent p-phenylenediamine | 2.0% by weight S* |
| Carbon black FW2 | 18.0% by weight S* |

S* = calculated as solid matter

Implementation (As in Example 5)

| Results | |
|---|---|
| Hegman gauge value | 12 μm |
| Depth of color (densitometer index) | 3.2 |
| Gloss | 91% |
| Viscosity (DIN cup, 4 mm nozzle) | 172 sec |

EXAMPLE 7
(Method of the Invention)

| Recipe | |
|---|---|
| Nitrocellulose chips, about 6 cm² × 1 mm (with 18% by weight dioctylphthalate or dibutylphthalate, viscosity 30″) | 50.0% by weight S* |
| Carbamic acid ester plasticizer | 18.5% by weight S* |
| Wetting agent p-phenylenediamine | 1.5% by weight S* |
| Carbon black Printex V | 30.0% by weight S* |

S* = calculated as solid matter

Implementation (As in Example 5)

| Results | |
|---|---|
| Hegman gauge value | <20 μm |
| Depth of color (densitometer index) | 2.7 |
| Gloss | 68% |
| Viscosity (DIN cup, 4 mm nozzle) | 20 sec |

EXAMPLE 8
(Method of the Invention)

| Recipe | |
|---|---|
| Nitrocellulose chips, about 6 cm² × 1 mm (with 18% by weight dioctylphthalate or dibutylphthalate, viscosity 30%) | 44.0% by weight S* |
| Carbamic acid ester plasticizer | 14.5% by weight S* |
| Phenylenediamine | 1.5% by weight S* |
| Carbon black "Spezialschwarz" 15 | 40.0% by weight S* |

S* = calculated as solid matter

Implementation (As in Example 5)

| Results | |
|---|---|
| Hegman gauge value | <20 μm |
| Depth of color (densitometer index) | 2.7 |
| Gloss | 68% |
| Viscosity (DIN cup, 4 mm nozzle) | 20 sec |

The following is a comparison with the aid of Examples 1 and 5 between the criteria "energy expenditure", "throughput rate" and "application characteristics" between the prior method and the method of the invention.

The energy expenditure is summarized from the following individual items:

| Ex.1 (acc. to W. German Patent 26 48 639) | | Ex.5 (method of the invention) | |
|---|---|---|---|
| Kneader | 0.22 kwh/kg product | Planetary mixer | 0.12 kwh/kg |
| Mixing roll (with evaporation of the solvent) | 1.84 kwh/kg product | Kneader | 0.3 kwh/kg |
| | | Two-roll mill | 0.03 kwh/kg |
| | | Cooling belt | 0.02 kwh/kg |
| Chopper | 0.1 kwh/kg product | Chopper | 0.2 kwh/kg |
| | 2.16 kwh/kg | | 0.67 kwh/kg |

The throughput rate in the reference method becomes apparent from the following comparison:

| Ex.1 (acc. to W. German Patent 26 48 639) | | Ex.5 (method of the invention) | |
|---|---|---|---|
| Time required for kneading of 250 kg | about 3 hours | Time required for the preparation of 250 kg premixtures | about 1 hour |
| Time required for the calendering with coincident elimination of the solvent for 250 kg | about 14 hours | Time required for the dispersion of 250 kg premixture | about 2.5 hrs |
| Time required for the chopping of 250 kg | about 1.5 hours | Time required for the calendering, cooling, and crushing of 250 kg dispersion | about 1.5 hrs |

Comparison between the application characteristics of the reference examples:

| | | Concentrates | |
|---|---|---|---|
| | | Example 1 | Example 5 |
| Hegman gauge value | μm | 13 | 10 |
| Depth of color (densitometer index) | % | 3.1 | 3.20 |
| Gloss at 20° | | 92 | 94 |
| Viscosity (DIN cup, 4 mm | sec | 90 | 138 |

| -continued | | |
|---|---|---|
| Comparison between the application characteristics of the reference examples: | | |
| | Concentrates | |
| | Example 1 | Example 5 |
| nozzle) | | |

Hence, it follows that the method of the invention which can be carried out without the use of solvents also enables one to save energy and to achieve a higher throughput rate without quality degradation.

EXAMPLE 9

(Prior Art Method)

| Recipe | |
|---|---|
| Nitrocellulose wool (with 35% weight ethanol, viscosity 30") | 51.5% by weight S* |
| Dibutylphthalate plasticizer | 10.0% by weight S* |
| Alkyd resin (Alkydal ® F 25 by Hoechst) | 17.0% by weight S* |
| Wetting agent bariumoctoate (in 50% by wt xylene) | 1.5% by weight S* |
| Carbon black FW2 | 20.0% by weight S* |

S* = calculated as solid matter

Implementation (As in Example 1)

(Addition of Resin for Preparation of Premixture)

| Results | |
|---|---|
| Hegman gauge value | 25 μm |
| Depth of color (densitometer index) | 2.81 |
| Gloss | 88% |
| Viscosity (DIN cup, 4 mm nozzle) | 140 sec |

EXAMPLE 10

(Method of the Invention)

| Recipe | |
|---|---|
| Nitrocellulose chips, about 6 mm² × 1 mm (with 18% dioctylphthalate or dibutylphthalate, viscosity 30") | 51.5% by weight S* |
| Dibutylphthalate plasticizer | 10.0% by weight S* |
| Alkyd resin (Skadonal ® 150 × 70) manufactured by Skado-Archer-Daniels GmbH, Metten) | 17.0% by weight S* |
| Wettng agent bariumoctoate (in 50% by weight dioctylphthalate) | 1.5% by weight S* |
| Carbon black FW2 | 20.0% by weight S* |

S* = calculated as solid matter

Implementation (As in Example 5)

(Addition of Resin for Premixture in Planetary Mixer)

| Results | |
|---|---|
| Hegman gauge value | 17 μm |
| Depth of color (densitometer index) | 2.9 |
| Gloss | 88% |
| Viscosity (DIN cup, 4 mm nozzle) | 125 sec |

In summary, the method of the invention has the following advantages over the prior art:

| Method of the invention | Prior art method |
|---|---|
| No use of solvent, non-polluting production. | Manadatory use of solvent. |
| Can be implemented partially continuously. | Can be implemented only discontinuously. |
| Short-duration mixing of the recipe constituents. | Long-duration kneading of recipe for the mixture constituents. |
| Dispersion of the mixture by short-duration kneading. | Dispersion of the mixture by repeated passage through a twin-roll mill. |
| Production of quality-consistent finished products. | Inconsistent quality due to batch-wise operation. |
| Modest requirements for raw materials, energy, time and personnel. | High requirments for new materials, energy, time and personnel. |

Further modifications and varifications of the invention will be apparent to those skilled in the art from the foregoing and are intended to be encompassed by the claims.

We claim:

1. A method for producing nitrocellulose-based carbon black concentrates comprising:
   (a) low molecular weight alcohol free nitrocellulose chips
   (b) carbon black
   (c) plasticizer, and
   (d) wetting agent wherein said alcohol free nitrocellulose is mixed thoroughly in the absence of a low molecular weight alcohol with the other constituents (b), (c) and (d) to form a free-flowing mixture, converting said mixture at an elevated temperature into a dispersion, then forming said dispersion into a film, cooling said film down to a temperature that allows it to be crushed, and crushing it into chips.

2. The method of claim 1 further comprising adding to the invention a nitrocellulose compatible resin.

3. The method as set forth in claim 1, further comprising carrying out the dispersion in a kneading machine or roller die extruder.

4. The method of claim 3, further comprising carrying out the dispersion in a continuously running kneading machine.

5. The method as set forth in claim 1, further comprising carrying out the dispersion at a temperature not exceeding 110° C.

6. The method of claim 5 wherein the temperature is between 50° and 110° C.

7. The method as set forth in claim 1, further comprising calendering the dispersion by means of a two-roll mill working with 1:1.2 friction and at a temperature of the material to be treated not exceeding 110° C. to form a film with a thickness under 1 mm, then cooling down said film to a temperature below 30° C.

8. The method of claim 7 wherein the calendering is at a temperature of between 50°–110° C.

9. The method of claim 7 wherein the film is cooled down to 10°–20° C.

10. The method as set forth in claim 7, wherein said film is cooled on a belt-type cooler.

11. The method as set forth in claim 1, wherein the initial substances are charged in the following quantities:
   (a) nitrocellulose: 30–80% by weight
   (b) nitrocellulose-compatible resin: 0–30% by weight (c) carbon black: 10–50% by weight
(d) plasticizer: 5–30% by weight
(e) wetting agent: 0.5–2.5% by weight 12. The method as set forth in claim 11, wherein oxidatively aftertreated furnace or gas carbon blacks are employed.

13. The method as set forth in claim 11, wherein alkyd resin, polyamide resin, maleinate resin, ketone resin, shellac or mixtures thereof is employed as the nitrocellulose-compatible resin.

14. The method as set forth in claim 6, wherein a metal oleate, metal octoate or phenylene diamine is used as a wetting agent.

* * * * *